(12) United States Patent
Jang et al.

(10) Patent No.: US 11,745,336 B2
(45) Date of Patent: Sep. 5, 2023

(54) ELASTIC BODY HAVING VARIABLE RIGIDITY, AND ACTUATOR MODULE INCLUDING SAME

(71) Applicant: ROBOTIS CO., LTD., Seoul (KR)

(72) Inventors: Wook Jang, Gwangmyeong-si (KR); Hyoung Chul Nam, Seoul (KR); Byoung Soo Kim, Seoul (KR)

(73) Assignee: ROBOTIS CO., LTD., Seoul (KR)

( * ) Notice: Subject to any disclaimer, the term of this patent is extended or adjusted under 35 U.S.C. 154(b) by 130 days.

(21) Appl. No.: 17/422,381

(22) PCT Filed: Apr. 5, 2019

(86) PCT No.: PCT/KR2019/004079
§ 371 (c)(1),
(2) Date: Jul. 12, 2021

(87) PCT Pub. No.: WO2020/204234
PCT Pub. Date: Oct. 8, 2020

(65) Prior Publication Data
US 2022/0118608 A1    Apr. 21, 2022

(30) Foreign Application Priority Data

Apr. 5, 2019    (KR) .................. 10-2019-0040006

(51) Int. Cl.
*F16D 3/10*    (2006.01)
*B25J 9/12*    (2006.01)
(Continued)

(52) U.S. Cl.
CPC .............. *B25J 9/126* (2013.01); *B25J 9/102* (2013.01); *B25J 19/0016* (2013.01); *F16D 3/10* (2013.01)

(58) Field of Classification Search
CPC ........ B25J 9/102; B25J 9/126; B25J 19/0016; F16D 3/10
(Continued)

(56) References Cited

U.S. PATENT DOCUMENTS 3,239,804 A * 3/1966 Hagedoorn ............ G01V 1/181
73/652
3,598,389 A * 8/1971 Kohler ................ F04B 39/1053
267/161

(Continued)

FOREIGN PATENT DOCUMENTS

CN    106641057    * 10/2018
JP    2005-214809 A    8/2005
(Continued)

*Primary Examiner* — William C Joyce
(74) *Attorney, Agent, or Firm* — Bridgeway IP Law Group, PLLC; Jihun Kim

(57) ABSTRACT

Proposed is an elastic body having variable rigidity, wherein the elastic body is used in a series elastic actuator module, connects an input and an output, and has a rigidity that varies according to the applied torque. The elastic body having variable rigidity comprises: a connection part which receives torque from the input side or the output side; and a spring part connected to and receiving torque from the one selected from among the input side and the output side which is different from the connection part, wherein the spring part is formed integrally with the connection part and has a rigidity that varies as the connection part and the spring part come into contact with each other due to deformation caused by the applied torque.

9 Claims, 7 Drawing Sheets

(51) Int. Cl.
    *B25J 9/10* (2006.01)
    *B25J 19/00* (2006.01)
(58) Field of Classification Search
    USPC .......................... 267/156; 74/DIG. 10, 411
    See application file for complete search history.

(56) References Cited

U.S. PATENT DOCUMENTS

| | | | | |
|---|---|---|---|---|
| 3,788,099 | A * | 1/1974 | Miller | F16D 3/78 |
| | | | | 464/98 |
| 5,492,313 | A * | 2/1996 | Pan | F16F 1/025 |
| | | | | 60/520 |
| D554,984 | S * | 11/2007 | Stenberg | D8/499 |
| 8,089,199 | B2 * | 1/2012 | Shu | F16F 1/324 |
| | | | | 428/591 |
| 8,176,809 | B2 * | 5/2012 | Ihrke | B25J 17/0241 |
| | | | | 267/161 |
| 8,876,094 | B1 * | 11/2014 | Ridgeway | F16F 7/12 |
| | | | | 267/161 |
| 9,086,101 | B2 * | 7/2015 | Zhu | B25J 9/0015 |
| 9,285,073 | B2 * | 3/2016 | Ellis | F16F 1/324 |
| 9,995,357 | B2 * | 6/2018 | Miyazaki | B25J 19/0091 |
| 2016/0102724 | A1 | 4/2016 | Hulse et al. | |

FOREIGN PATENT DOCUMENTS

| | | |
|---|---|---|
| JP | 2014-059277 A | 4/2014 |
| KR | 10-2017-0037442 A | 4/2017 |
| WO | 2018/124081 A1 | 7/2018 |

\* cited by examiner

ELASTIC BODY HAVING VARIABLE RIGIDITY, AND ACTUATOR MODULE INCLUDING SAME

TECHNICAL FIELD

The present invention relates to a variable-stiffness elastic body and an actuator module including the same, and more particularly to an actuator module including a variable-stiffness elastic body having stiffness that varies depending on the magnitude of torque.

BACKGROUND ART

Recently, robots have come to be used in a wide variety of applications, including industrial robots, home robots, and humanoid robots, and accordingly robot technology has developed rapidly. In particular, in relation to robot technology, an actuator (a driving device) installed for operation of joints of a robot is one of essential parts of a robot. An actuator uses a speed reducer as a main component, and representative examples of a speed reducer include a planetary-gear-type speed reducer, a harmonic speed reducer, and a cycloid speed reducer.

An actuator in which an elastic member is interposed between an input side and an output side is generally known as a series elastic actuator (SEA), which is a device in which an elastic member (e.g. a spring) is mounted so as to directly measure torque of the actuator based on the extent of deformation of the elastic member in response to application of an external load thereto.

FIG. 1 is a view showing an example of a conventional series elastic actuator. Referring to FIG. 1, in order to measure the extent of deformation of an elastic member 50 upon application of an external load 70, encoders 40 and 60 for measuring the amount of rotational deformation are generally used. The encoders 40 and 60 are respectively mounted in front of and behind the elastic member 50 to measure the extent of deformation of the elastic member 50 using the difference in the extent of deformation between the front end and the rear end of the elastic member 50.

In recent years, interest in cooperative robots has increased in industrial fields. In order to ensure the safety of workers, it is necessary to precisely control the torque (force) of an actuator, which constitutes each joint of cooperative robots. In order to precisely control the torque of an actuator, a component measuring the torque (force), among components of the actuator, is required to have a high resolution.

In order to increase the resolution of input torque, it is required to measure the displacement of a spring with high precision. However, as the displacement of a spring to be measured is smaller, a sensor having a higher resolution is required, which incurs high costs, resulting in limited applicability to actual products.

Therefore, there is need for a method capable of achieving precise measurement using a low-resolution sensor. To this end, a low-stiffness spring exhibiting a large displacement is required. However, when high torque is applied thereto, a low-stiffness spring is highly likely to be permanently deformed or damaged.

DISCLOSURE

Technical Problem

An object of the present invention is to provide an elastic body having a variable stiffness structure, which not only exhibits a large displacement in a low-torque region, thereby enabling precise measurement using a low-resolution sensor, but also enables measurement and is prevented from being permanently deformed or damaged in a high-torque region, and an actuator module including the same.

The objects to be accomplished by the present invention are not limited to the above-mentioned object, and other objects not mentioned herein will be clearly understood by those skilled in the art from the following description.

Technical Solution

In order to accomplish the above object, an embodiment of the present invention provides a variable-stiffness elastic body connecting an input side and an output side of a series elastic actuator module to each other, the variable-stiffness elastic body having stiffness that varies depending on torque applied thereto. The variable-stiffness elastic body includes a link portion, configured to receive torque from the input side or the output side, and a spring portion, connected to the one among the input side and the output side that is not connected to the link portion in order to receive torque therefrom, the spring portion being integrally formed with the link portion, the spring portion having stiffness that varies due to contact with the link portion when deformed by torque applied thereto.

In the embodiment of the present invention, the spring portion may include a central body connected to the input side or the output side to receive torque therefrom, a connection portion extending outwards from the central body, and a deformable portion extending from the outer end of the connection portion along the circumference of the central body, the deformable portion being bent multiple times so as to repeatedly approach and move away from the central body, the link portion being integrally connected to the deformable portion.

In the embodiment of the present invention, the deformable portion may include a first elastic portion, including a first circumferential portion disposed opposite the central body, with the link portion interposed therebetween, and a first radial portion extending from each of both ends of the first circumferential portion toward the central body, and a second elastic portion including a second circumferential portion extending bidirectionally from the outer end of the connection portion so as to be opposite the central body and a second radial portion extending from each of both ends of the second circumferential portion toward the central body, the second radial portion being bent near the central body so as to be connected to the first radial portion. The link portion may extend from the first circumferential portion, and the first elastic portion and the second elastic portion may be alternatingly formed along the circumference of the central body.

In the embodiment of the present invention, in the state in which the link portion and the first radial portion are spaced apart from each other, both the first elastic portion and the second elastic portion may contribute to stiffness of the spring portion upon application of torque, and in the state in which the link portion and the first radial portion are deformed by torque and are in contact with each other, only the second elastic portion, among the first elastic portion and the second elastic portion, may contribute to stiffness of the spring portion upon application of torque.

In the embodiment of the present invention, the link portion may protrude from the side surface of the first circumferential portion toward the central body, and a fastening hole for engagement with the input side or the output side may be formed in the end portion of the link portion that is located near the central body.

In the embodiment of the present invention, the elastic moduli of the first elastic portion and the second elastic portion may be adjusted by adjusting the widths and shapes of the first elastic portion and the second elastic portion, and the torque at which the link portion and the first radial portion come into contact with each other may be set by adjusting the elastic moduli of the first elastic portion and the second elastic portion.

In the embodiment of the present invention, when viewed in the axial direction of the input side or the output side, the elastic moduli of the first elastic portion and the second elastic portion may be adjusted by adjusting the widths and shapes of the first elastic portion and the second elastic portion, the width of the first elastic portion may be constant, or may have a shape that gradually changes, and the width of the second elastic portion may be constant, or may have a shape that gradually changes.

In the embodiment of the present invention, the deformable portion may further include a third elastic portion located between the first elastic portion and the second elastic portion. The third elastic portion may include a third circumferential portion, disposed between the first circumferential portion and the second circumferential portion so as to be opposite the central body, and a third radial portion, extending from each of both ends of the third circumferential portion toward the central body, the third radial portion being bent near the central body so as to be connected to the first radial portion and to the second radial portion. In the state in which the link portion and the first radial portion are spaced apart from each other, all of the first elastic portion, the second elastic portion, and the third elastic portion may contribute to stiffness of the spring portion upon application of torque. In the state in which the link portion and the first radial portion are deformed by torque and are in contact with each other, only the second elastic portion and the third elastic portion, among the first elastic portion, the second elastic portion, and the third elastic portion, may contribute to stiffness of the spring portion upon application of torque. In the state in which torque increases and the connection portion between the third radial portion and the first radial portion is in contact with the connection portion between another third radial portion and the second radial portion, only the second elastic portion, among the first elastic portion, the second elastic portion, and the third elastic portion, may contribute to stiffness of the spring portion upon application of torque.

In order to accomplish the above object, another embodiment of the present invention provides an actuator module including a variable-stiffness elastic body. The actuator module including a variable-stiffness elastic body includes a motor, a gear module connected to the motor, an output unit acting on an external load, a variable-stiffness elastic body transmitting power from the gear module to the output unit, the variable-stiffness elastic body including a link portion configured to receive torque from the gear module or the output unit and a spring portion connected to the one among the gear module and the output unit that is not connected to the link portion in order to receive torque therefrom, the spring portion being integrally formed with the link portion, the variable-stiffness elastic body having stiffness that varies due to contact between the link portion and the spring portion when deformed by torque, and a sensor configured to sense deformation of the spring portion.

In the embodiment of the present invention, the spring portion may include a central body connected to an input side or an output side to receive torque therefrom, a connection portion extending outwards from the central body, and a deformable portion extending from the outer end of the connection portion along the circumference of the central body, the deformable portion being bent multiple times so as to repeatedly approach and move away from the central body, the link portion being integrally connected to the deformable portion. The deformable portion may include a first elastic portion including a first circumferential portion disposed opposite the central body, with the link portion interposed therebetween, and a first radial portion extending from each of both ends of the first circumferential portion toward the central body, and a second elastic portion including a second circumferential portion, extending bidirectionally from the outer end of the connection portion so as to be opposite the central body, and a second radial portion, extending from each of both ends of the second circumferential portion toward the central body, the second radial portion being bent near the central body so as to be connected to the first radial portion. The link portion may extend from the first circumferential portion, and the first elastic portion and the second elastic portion may be alternatingly formed along the circumference of the central body.

Advantageous Effects

According to embodiments of the present invention, it is possible to provide a variable-stiffness elastic body and an actuator module including the same capable of increasing resolution in a low-torque region and of increasing an overall torque measurement region through variation in the stiffness of a spring by self-contact of the spring in consideration of the shape and deformation characteristics inherent to the spring.

The effects of the present invention are not limited to the above-mentioned effects, and it should be understood that the effects include all effects that can be inferred from the configuration of the invention described in the detailed description or appended claims of the present invention.

BEST MODE

Figure 1:
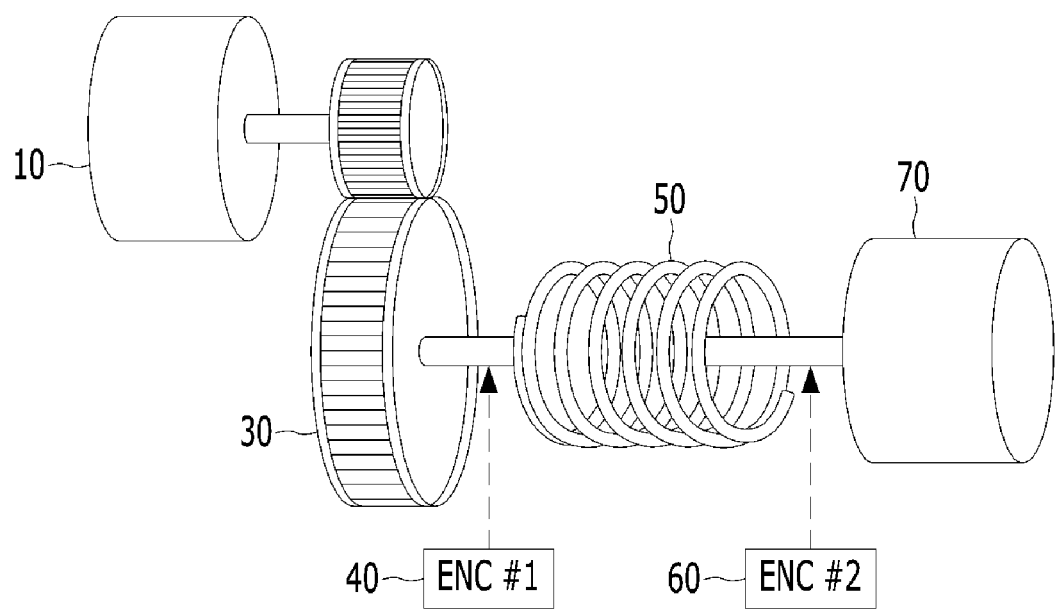
FIG. 1 is a view showing an example of a conventional series elastic actuator.

Hereinafter, the present invention will be described with reference to the accompanying drawings. The present invention may, however, be embodied in many different forms, and should not be construed as being limited to the embodiments set forth herein. In the drawings, parts irrelevant to the description of the present invention will be omitted for clarity. Like reference numerals refer to like elements throughout the specification.

In the entire specification, when it is described that one component is "connected to (joined to, in contact with, coupled to)" another component, the former may be "directly connected to" the latter, or may be "indirectly connected to" the latter, with another component interposed therebetween. In addition, when an element is referred to as "including" another element, the element should not be understood as excluding other elements, so long as there is no particular conflicting description, and the element may further include other elements.

The terms used in the present specification are used only to describe specific embodiments, and are not intended to restrict the present invention. A singular expression includes the plural meaning unless the singular expression is explicitly distinct based on the context. In the present specification, the term "including" or "having" shall be understood to designate the presence of features, numbers, steps, operations, elements, parts, or combinations thereof described in the specification, but not to preclude the presence or addition of one or more other features, numbers, steps, operations, elements, parts, or combinations thereof.

Hereinafter, embodiments of the present invention will be described in detail with reference to the accompanying drawings.

Figure 2:
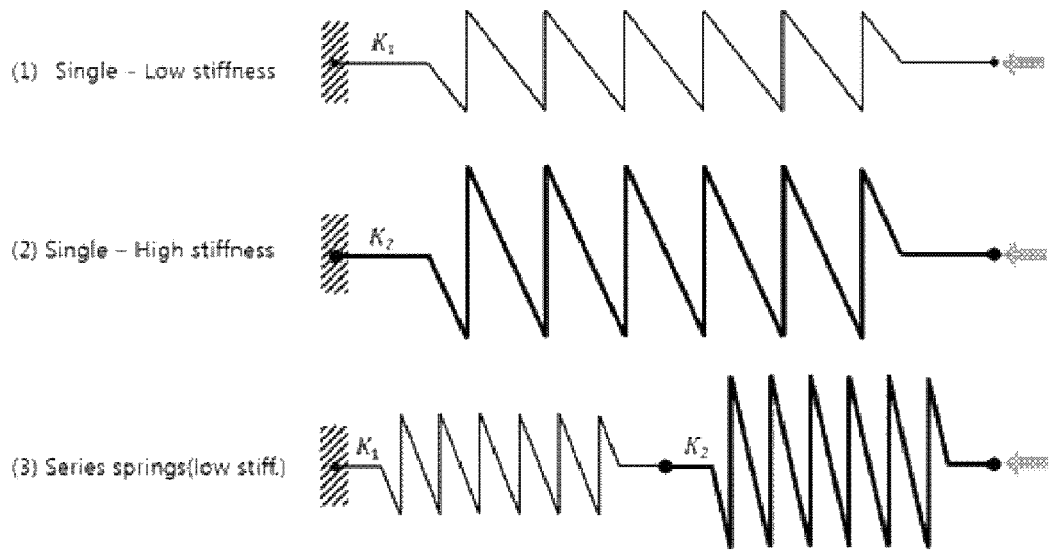
FIG. 2 is a diagram for explaining the case in which a low-stiffness spring and a high-stiffness spring are simply connected in series.
Figure 2:
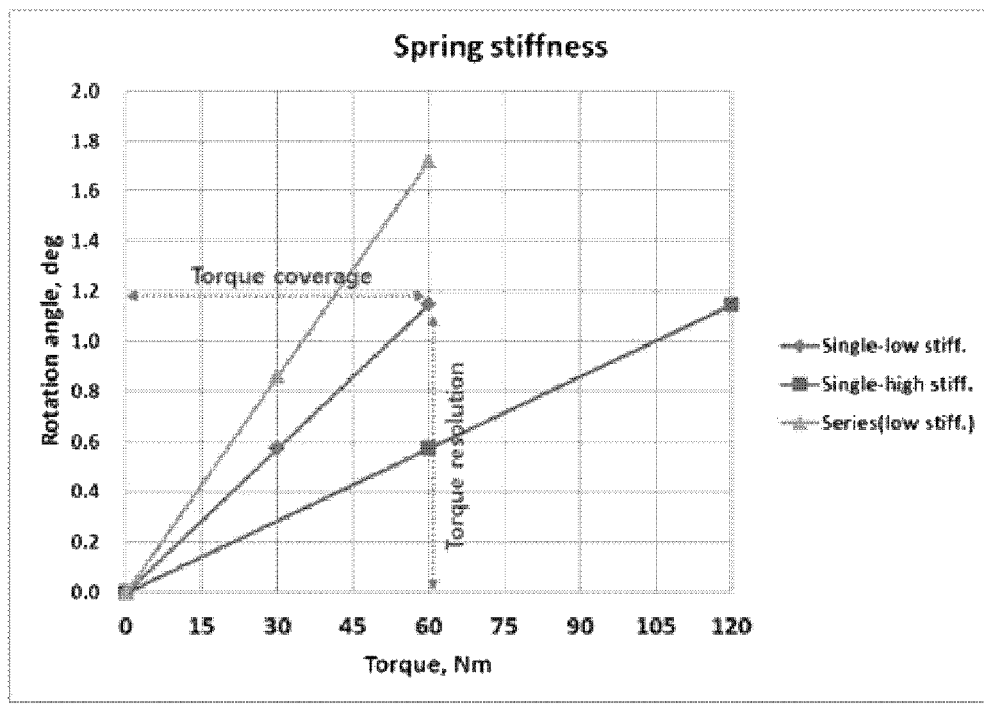

FIG. 2 is a diagram for explaining the case in which a low-stiffness spring and a high-stiffness spring are simply connected in series.

Referring to FIG. 2, in a series elastic actuator (SEA), an elastic body connecting an input side of the SEA and an output side thereof to each other, for example, a plate-type spring, has constant stiffness.

For an encoder having a given performance, the resolution of deformation of the elastic body that can be sensed by the encoder, i.e. torque resolution, and a torque-sensing range (torque coverage) vary depending on the stiffness of the elastic body (refer to the first and second spring diagrams in FIG. 2). However, because the stiffness of a single elastic body is constant, the torque resolution and the torque coverage are fixed, rather than varying in response to the situation.

On the other hand, referring to the third spring diagram in FIG. 2, it is possible to reduce the overall stiffness and thus to increase the torque resolution by connecting elastic bodies in series. In this case, however, the torque coverage is not increased, as shown in the lower graph in FIG. 2.

Also, there is a limitation to the extent to which resolution can be increased by reducing the stiffness of a single elastic body. That is, as the stiffness of the elastic body is reduced, the extent of deformation thereof is increased, but when the extent of deformation thereof exceeds a predetermined level, the elastic body reaches a plastic deformation region, and thus undergoes permanent deformation, which means damage (loss of function) to the elastic body 200, i.e. the spring.

Figure 3:
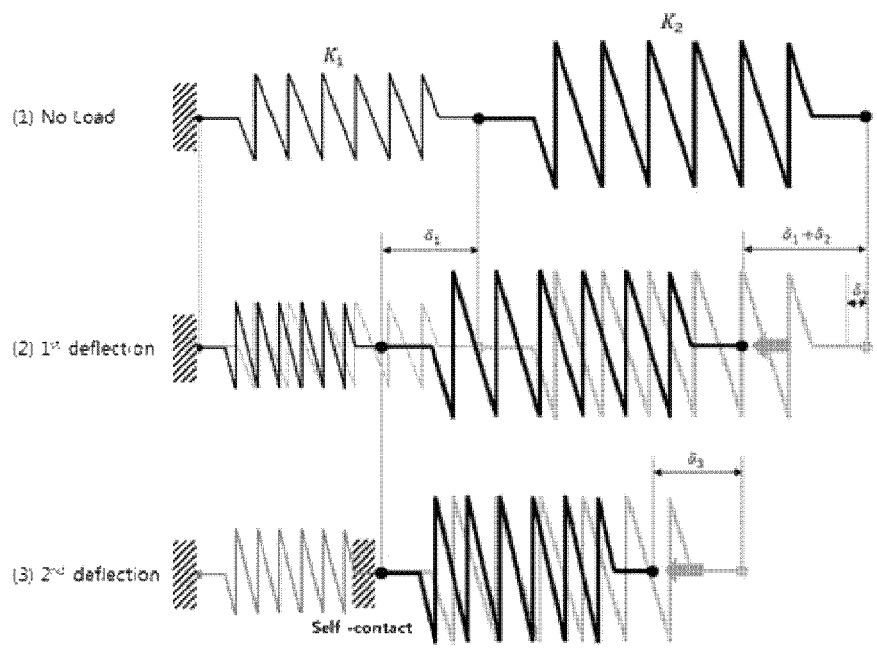
FIG. 3 is a diagram for explaining the behavioral characteristics of an actuator module including a variable-stiffness elastic body according to an embodiment of the present invention.
Figure 3:
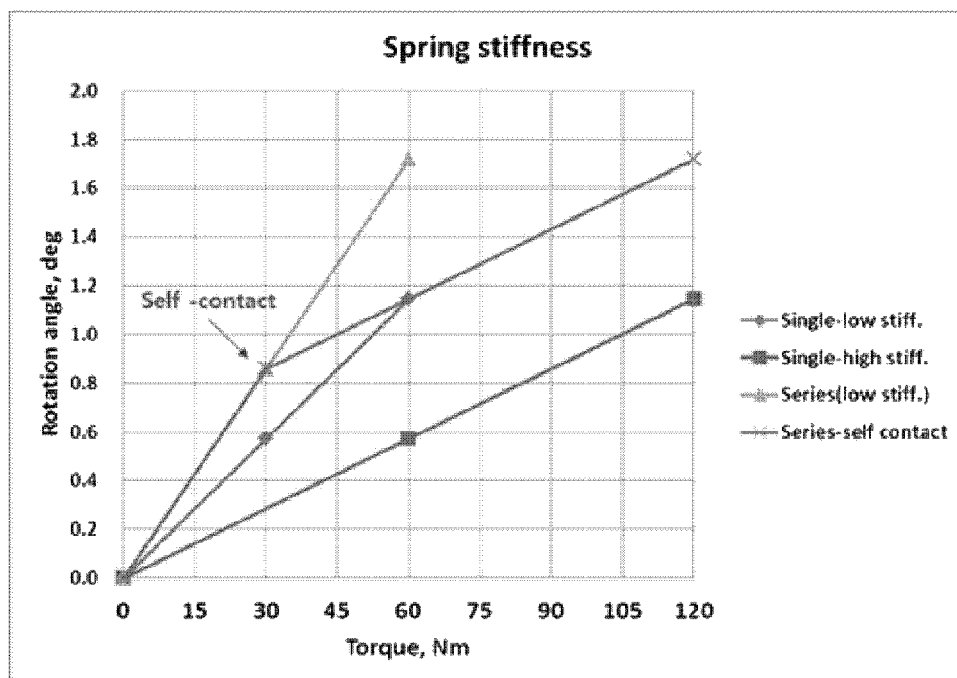

FIG. 3 is a diagram for explaining the behavioral characteristics of an actuator module 100 including a variable-stiffness elastic body 200 according to an embodiment of the present invention.

The actuator module 100 (refer to FIG. 4) including the variable-stiffness elastic body 200 according to the embodiment may be applied to a series elastic driving module (a series elastic actuator (SEA)) employing a torque control scheme, which measures the extent of deformation (rotational angle) of the elastic body 200 in response to a load applied from outside using an encoder and converts the measured value into torque.

According to the actuator module 100 including the variable-stiffness elastic body 200 of the embodiment, due to the shape and deformation (behavioral) characteristics inherent to the elastic body 200, a part of the elastic body 200 comes into contact with another part of the elastic body 200, and this self-contact thereof causes variation in the stiffness thereof, thereby making it possible to increase resolution in a low-torque region and to increase or improve an overall torque measurement region (torque coverage).

Figure 4:
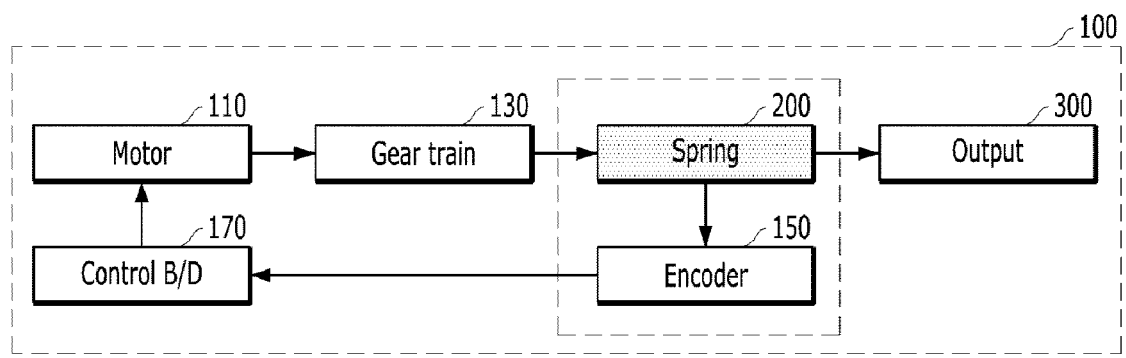
FIG. 4 is a block diagram of an actuator module including a variable-stiffness elastic body according to an embodiment of the present invention.

FIG. 4 is a block diagram of an actuator module 100 including a variable-stiffness elastic body 200 according to an embodiment of the present invention.

An actuator module 100 including a variable-stiffness elastic body 200 (hereinafter referred to as the actuator module) may include a motor 110, a gear module 130 connected to the motor 110, an output unit 300 acting on an external load, a variable-stiffness elastic body 200, and a sensor 150.

The gear module 130 (e.g. a speed reduction gear module) may be coupled to the front end of the motor 110. The variable-stiffness elastic body 200 is provided near the gear module 130 to receive power from the gear module 130. The variable-stiffness elastic body 200 may be a substantially disk-shaped elastic body (refer to FIG. 5).

The shape or structure of the variable-stiffness elastic body 200 may be variously modified. In addition, the variable-stiffness elastic body 200 may be formed of a metal material, or may alternatively be formed of a material other than metal (e.g. rubber or plastic).

The output unit 300 may be connected to the rear end or the output end of the variable-stiffness elastic body 200, and may act on an external load, or may be coupled thereto to transmit power thereto.

The sensor 150 (e.g. an encoder) may sense the extent of deformation of the variable-stiffness elastic body 200 when a load is applied to the output unit 300.

Figure 5:
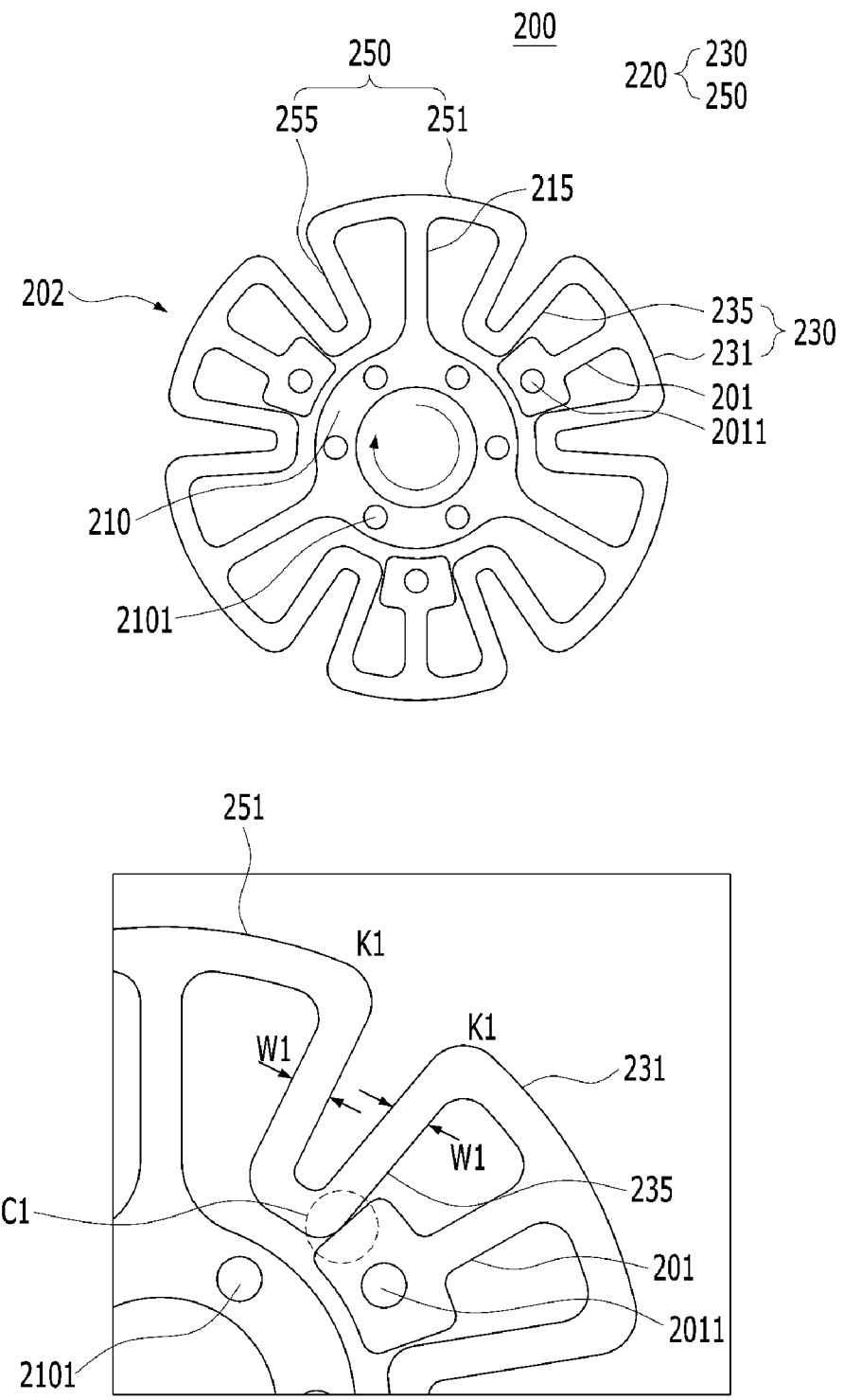
FIG. 5 is a view for explaining an example of a variable-stiffness elastic body of an actuator module including a variable-stiffness elastic body according to an embodiment of the present invention.

FIG. 5 is a view for explaining an example of the variable-stiffness elastic body 200 of the actuator module 100 including the variable-stiffness elastic body 200 according to an embodiment of the present invention.

The variable-stiffness elastic body 200 may transmit power from the gear module 130 (input side) to the output unit 300 (output side), and the stiffness thereof may vary according to the torque applied thereto.

The variable-stiffness elastic body 200 may include a link portion 201 and a spring portion 202.

The link portion 201 may receive torque from the input side or the output side.

The spring portion 202 may be connected to the one among the input side and the output side that is not connected to the link portion 201 in order to receive torque therefrom. The spring portion 202 and the link portion 201 may be integrally formed with each other.

When torque is applied thereto, the link portion 201 and the spring portion 202 may come into contact with each other due to deformation thereof. Accordingly, the stiffness of the variable-stiffness elastic body 200 that resists the torque may be changed.

In this embodiment, the case in which the spring portion 202 is connected to the input side and the link portion 201 is connected to the output side will be described by way of example. Of course, the opposite connection structure is also possible.

Referring to FIG. 5, the spring portion 202 may include a central body 210 connected to the input side to receive torque therefrom, a connection portion 215 extending outwards from the central body 210 in the radial direction, and a deformable portion 220.

The central body 210 may be connected to the rotary shaft of the gear module 130. The central body 210 may have a circular ring shape, and a central-body fastening hole 2101 for engagement with the gear module 130 may be formed in the central body 210.

The deformable portion 220 may extend from the outer end of the connection portion 215 along the circumference of the central body 210 in the circumferential direction, and may have a shape that is bent multiple times so as to repeatedly approach and move away from the central body 210. The link portion 201 may be integrally connected to the deformable portion 220.

For example, the deformable portion 220 may include a first elastic portion 230 and a second elastic portion 250.

The first elastic portion 230 may include a first circumferential portion 231 disposed opposite the central body 210, with the link portion 201 interposed therebetween, and a first radial portion 235 extending from each of both ends of the first circumferential portion 231 toward the central body 210.

The second elastic portion 250 may include a second circumferential portion 251, which extends bidirectionally from the outer end of the connection portion 215 so as to be opposite the central body 210, and a second radial portion 255, which extends from each of both ends of the second circumferential portion 251 toward the central body 210 and is bent near the central body 210 so as to be connected to the first radial portion 235.

The first elastic portion 230 and the second elastic portion 250 may be alternatingly formed along the circumference of the central body 210.

The link portion 201 may protrude from the side surface of the first circumferential portion 231 toward the central body 210, and a link-portion fastening hole 2011 for engagement with the input side or the output side may be formed in the end portion of the link portion 201 that is located near the central body 210.

When driving force is transmitted from the gear module 130 to the central body 210 and an output-side load is applied to the link portion 201, torque may be transmitted to the deformable portion 220 through the central body 210 and the link portion 201. Accordingly, the deformable portion 220 may be deformed, and, as described above, the sensor 150 may sense the extent of deformation and calculate the torque.

In a low-torque state, the spring portion 202 is deformed, but the link portion 201 and the first radial portion 235 are maintained in the state of being spaced apart from each other. In this low-torque state, both the first elastic portion 230 and the second elastic portion 250 may contribute to the stiffness of the spring portion 202 upon application of the torque.

That is, when the stiffness of the first elastic portion 230, i.e. the elastic modulus, is K1 and the elastic modulus of the second elastic portion 250 is K2, the stiffness K of the variable-stiffness elastic body 200 in a low-torque state may be determined using the following equation: $1/K = 1/K1 + 1/K2$. That is, the first elastic portion 230 and the second elastic portion 250 exhibit an effect of being connected in series.

In this embodiment, when viewed in the axial direction of the input side or the output side, the first elastic portion 230 and the second elastic portion 250 may be the same thickness, and may have the same elastic modulus.

Accordingly, the stiffness K of the variable-stiffness elastic body 200 may be determined using the following equation: $1/K = 2/K1$.

On the other hand, when the torque increases and thus the extent of deformation increases, that is, in a high-torque region, the link portion 201 and the first radial portion 235 may come into contact with each other. In this case, the second elastic portion 250 may bear the torque applied to the deformable portion 220. That is, in a high-torque state, only the second elastic portion 250, among the first elastic portion 230 and the second elastic portion 250, may contribute to the stiffness of the variable-stiffness elastic body 200. That is, in this high-torque state, the stiffness K of the variable-stiffness elastic body 200 may be equal to K2.

In the example shown in FIG. 5, when viewed in the axial direction of the input side or the output side, the first elastic portion 230 and the second elastic portion 250 may have the same width (or thickness) and the same shape, and thus K1 may be equal to K2.

Therefore, with regard to the variable-stiffness elastic body 200 of the present embodiment, the deformation-torque relationship in the graph shown in FIG. 3 follows a series-self contact graph.

That is, the slope is large in a low-torque region (before contact), and the slope is small in a high-torque region (after contact). In other words, in a low-torque region, the torque resolution becomes relatively large. In addition, sensing is possible even in a high-torque region, whereby torque coverage may be increased or improved.

Figure 6:
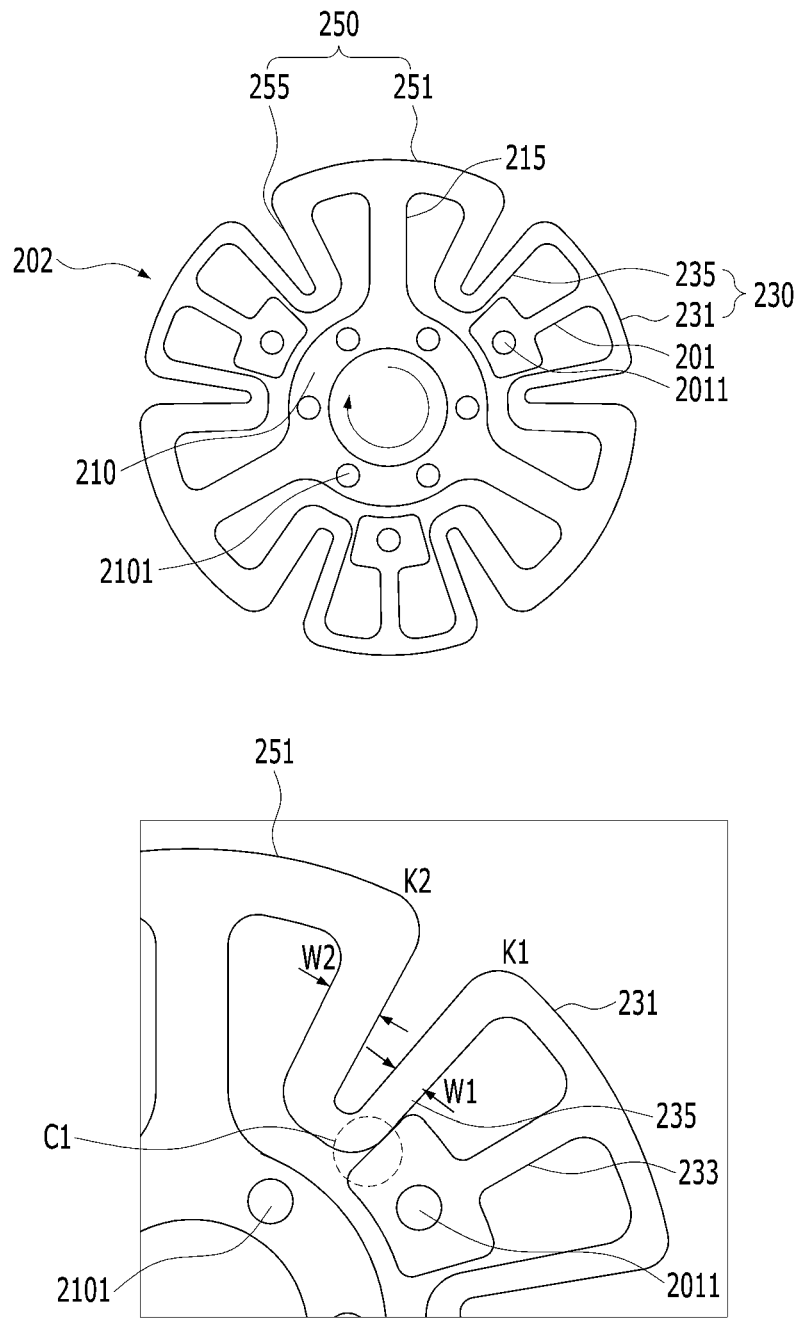
FIG. 6 is a view for explaining another example of a variable-stiffness elastic body of an actuator module including a variable-stiffness elastic body according to an embodiment of the present invention.

FIG. 6 is a view for explaining another example of the variable-stiffness elastic body 200 of the actuator module 100 including the variable-stiffness elastic body 200 according to an embodiment of the present invention.

In the variable-stiffness elastic body 200 shown in FIG. 6, when viewed in the axial direction of the input side or the output side, the first elastic portion 230 and the second elastic portion 250 may have different widths or thicknesses from each other. Since the width or thickness of the first radial portion 235 of the first elastic portion 230 is smaller than the width or thickness of the second radial portion 255 of the second elastic portion 250, the stiffness K1 of the first elastic portion 230 is lower than the stiffness K2 of the second elastic portion 250.

Before contact, the stiffness K of the variable-stiffness elastic body 200 may be determined using the following equation, as described above.

$$1/K = 1/K1 + 1/K2$$

After contact, the stiffness K of the variable-stiffness elastic body 200 may become equal to K2.

Of course, unlike the present embodiment, when viewed in the axial direction of the input side or the output side, the width or thickness of the first radial portion 235 of the first elastic portion 230 may be made to be larger than the width or thickness of the second radial portion 255 of the second elastic portion 250, so the stiffness K1 of the first elastic portion 230 may be higher than the stiffness K2 of the second elastic portion 250.

In this way, it is possible to adjust the elastic moduli of the first elastic portion 230 and the second elastic portion 250 by adjusting the widths and shapes of the first elastic portion 230 and the second elastic portion 250, and it is possible to set the torque at which the link portion 201 and the first radial portion 235 come into contact with each other by adjusting the elastic moduli of the first elastic portion 230 and the second elastic portion 250.

In relation to the adjustment of the width or the shape when viewed in the axial direction of the input side or the output side, the elastic moduli of the first elastic portion 230 and the second elastic portion 250 may be adjusted by adjusting the widths and shapes of the first elastic portion 230 and the second elastic portion 250, the first elastic portion 230 may have a constant width, or may be formed to have a shape in which the width thereof gradually changes (e.g. a streamlined shape), and the second elastic portion 250 may have a constant width, or may be formed to have a shape in which the width thereof gradually changes.

Figure 7:
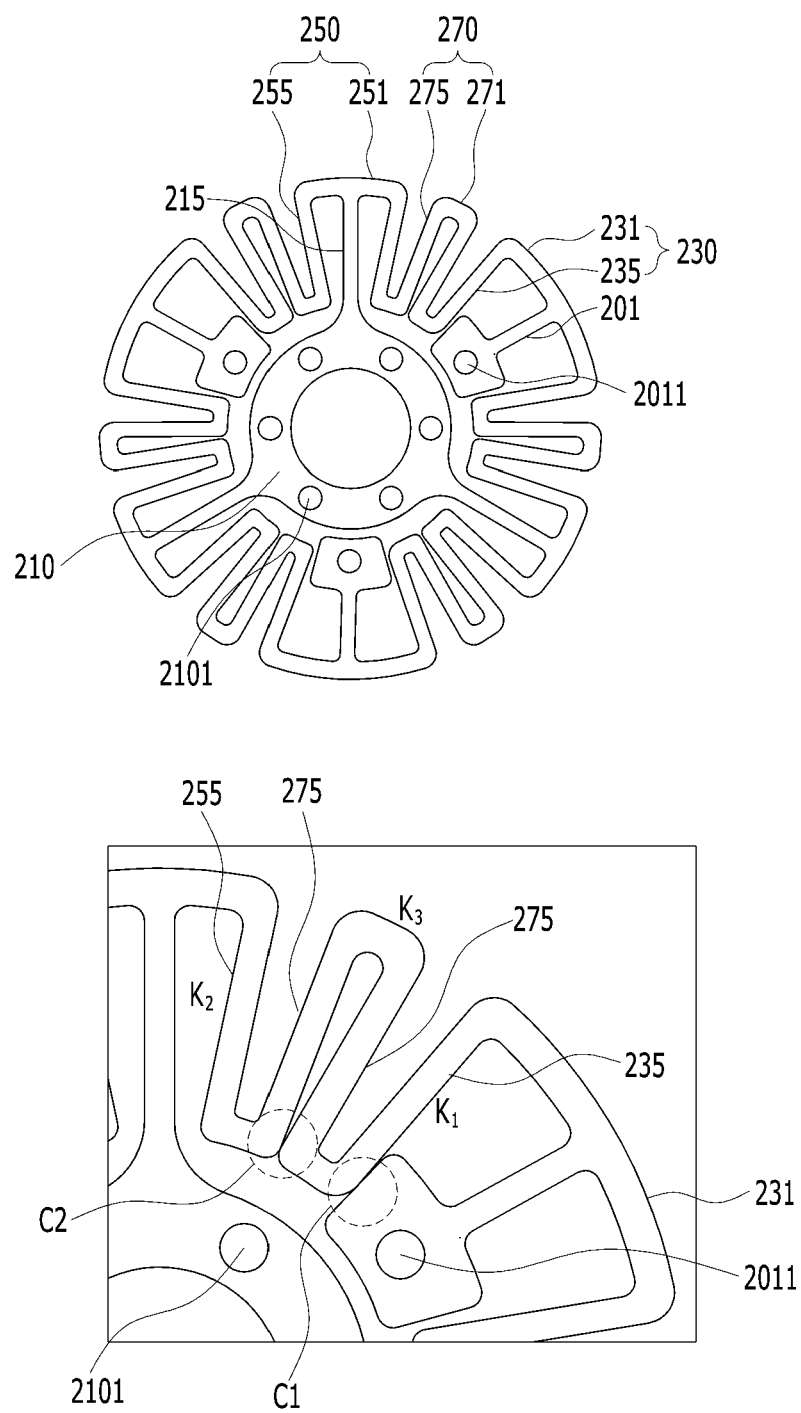
FIG. 7 is a view for explaining still another example of a variable-stiffness elastic body of an actuator module including a variable-stiffness elastic body according to an embodiment of the present invention.

FIG. 7 is a view for explaining still another example of the variable-stiffness elastic body 200 of the actuator module 100 including the variable-stiffness elastic body 200 according to an embodiment of the present invention.

The deformable portion 220 of the variable-stiffness elastic body 200 shown in FIG. 7 may further include a third elastic portion 270, which is disposed between the first elastic portion 230 and the second elastic portion 250. The first elastic portion 230, the third elastic portion 270, and the second elastic portion 250 may be alternatingly arranged around the central body 210 in this order.

The third elastic portion 270 may include a third circumferential portion 271, which is disposed between the first circumferential portion 231 and the second circumferential portion 251 so as to be opposite the central body 210, and a third radial portion 275, which extends from each of both ends of the third circumferential portion 271 toward the central body 210 and is bent near the central body 210 so as to be connected to the first radial portion 235 and to the second radial portion 255.

In the state in which the link portion 201 and the first radial portion 235 are spaced apart from each other, that is, in a low-torque state, all of the first elastic portion 230, the second elastic portion 250, and the third elastic portion 270 may contribute to the stiffness of the spring portion 202 upon application of the torque.

When the elastic modulus of the third elastic portion 270 is K3, the stiffness K of the variable-stiffness elastic body 200 in a low-torque state may be determined using the following equation: $1/K=1/K1+1/K2+1/K3$. That is, the first elastic portion 230, the second elastic portion 250, and the third elastic portion 270 exhibit an effect of being connected in series.

When the spring portion 202 is deformed by torque and thus the link portion 201 and the first radial portion 235 are in the state of contacting each other (C1) (in a primary high-torque state), only the second elastic portion 250 and the third elastic portion 270, among the first elastic portion 230, the second elastic portion 250, and the third elastic portion 270, may contribute to the stiffness of the spring portion 202 upon application of the torque.

Therefore, the stiffness K of the variable-stiffness elastic body 200 in the primary high-torque state may be determined using the following equation.

$$1/K=1/K2+1/K3$$

In addition, when the torque further increases and thus the extent of deformation is further increased (a secondary high-torque state), the connection portion between the third radial portion 275 and the first radial portion 235 may come into contact with the connection portion between another third radial portion 275 and the second radial portion 255 (C2). In this case, only the second elastic portion 250 may contribute to the stiffness of the spring portion 202 upon application of the torque.

Accordingly, in the secondary high-torque state, the stiffness K of the variable-stiffness elastic body 200 may become equal to K2.

According to the embodiments of the present invention, it is possible to increase torque resolution in a low-torque region and to increase or improve overall torque coverage.

Therefore, in fields in which the variable-stiffness elastic actuator module 100 is installed, the variable-stiffness elastic actuator module 100 is capable of realizing sensitive action and of further ensuring safe operation.

The above description is merely illustrative of the present invention, and those skilled in the art should understand that the present invention can be easily modified in other specific forms without changing the technical spirit or essential features of the present invention. Therefore, the embodiments described above are illustrative in all aspects and should not be understood as limiting. For example, each element described as having an integrated form may be embodied in a distributed manner, and likewise, elements described as being distributed may be embodied in an integrated form.

The scope of the present invention is defined by the appended claims, and all modifications or modified forms derived from the meaning and scope of the claims and concepts equivalent thereto should be interpreted as falling within the scope of the present invention.

INDUSTRIAL APPLICABILITY

It has been described in the best mode for carrying out the invention.

The invention claimed is:

1. A variable-stiffness elastic body connecting an input side and an output side of an elastic actuator module to each other, the variable-stiffness elastic body having stiffness that varies depending on torque applied thereto, the variable-stiffness elastic body comprising:
 a link portion configured to receive torque from the input side or the output side; and
 a spring portion connected to the input side or the output side that is not connected to the link portion in order to receive torque therefrom, the spring portion being integrally connected with the link portion, the spring portion having stiffness that varies due to contact with the link portion when deformed by torque applied thereto,
 wherein the spring portion comprises:
 a central body connected to the input side or the output side to receive torque therefrom;
 a connection portion extending outwards from the central body; and
 a deformable portion extending from an outer end of the connection portion along a circumference of the central body, the deformable portion being bent multiple times so as to repeatedly approach and move away from the central body, the link portion being integrally connected to the deformable portion,
 wherein the connection portion includes a plurality of bars each having a substantially straight elongated body, and
 wherein the link portion radially extends from a circumference of the deformable portion toward the central body.

2. The variable-stiffness elastic body according to claim 1, wherein the deformable portion comprises:
a first elastic portion comprising a first circumferential portion spaced apart from the central body in a radial direction to be opposite to the central body, and a first radial portion extending from both ends of the first circumferential portion toward the central body; and
a second elastic portion comprising a second circumferential portion extending bidirectionally from the outer end of the connection portion to be opposite to the central body, and a second radial portion, extending from both ends of the second circumferential portion toward the central body, the second radial portion being bent near the central body to be connected to the first radial portion, and
wherein the link portion radially extends from the first circumferential portion, and
wherein the first elastic portion and the second elastic portion are alternately arranged along the circumference of the central body.

3. The variable-stiffness elastic body according to claim 2, wherein, in a state in which the link portion and the first radial portion are spaced apart from each other, both the first elastic portion and the second elastic portion contribute to stiffness of the spring portion upon application of torque, and
wherein, in a state in which the link portion and the first radial portion are deformed by torque and are in contact with each other, only the second elastic portion, among the first elastic portion and the second elastic portion, contributes to stiffness of the spring portion upon application of torque.

4. The variable-stiffness elastic body according to claim 3, wherein elastic moduli of the first elastic portion and the second elastic portion are adjusted by adjusting widths and shapes of the first elastic portion and the second elastic portion, and
wherein torque at which the link portion and the first radial portion come into contact with each other is set by adjusting the elastic moduli of the first elastic portion and the second elastic portion.

5. The variable-stiffness elastic body according to claim 3, wherein, when viewed in an axial direction of the input side or the output side, elastic moduli of the first elastic portion and the second elastic portion are adjusted by adjusting widths and shapes of the first elastic portion and the second elastic portion,
wherein the width of the first elastic portion is constant or gradually changes, and
wherein the width of the second elastic portion is constant or gradually changes.

6. The variable-stiffness elastic body according to claim 3, wherein the deformable portion further comprises:
a third elastic portion located between the first elastic portion and the second elastic portion,
wherein the third elastic portion comprises:
a third circumferential portion disposed between the first circumferential portion and the second circumferential portion to be opposite to the central body; and
a third radial portion extending from both ends of the third circumferential portion toward the central body, the third radial portion being bent near the central body to be connected to the first radial portion and to the second radial portion,
wherein, in a state in which the link portion and the first radial portion are spaced apart from each other, all of the first elastic portion, the second elastic portion, and the third elastic portion contribute to stiffness of the spring portion upon application of torque,
wherein, in a state in which the link portion and the first radial portion are deformed by torque and are in contact with each other, only the second elastic portion and the third elastic portion, among the first elastic portion, the second elastic portion, and the third elastic portion, contribute to stiffness of the spring portion upon application of torque, and
wherein, in a state in which torque increases and a connection portion between the third radial portion and the first radial portion is in contact with a connection portion between another third radial portion and the second radial portion, only the second elastic portion, among the first elastic portion, the second elastic portion, and the third elastic portion, contributes to stiffness of the spring portion upon application of torque.

7. The variable-stiffness elastic body according to claim 2, wherein the link portion has a fastening hole for engagement with the input side or the output side is formed in an end portion of the link portion that is located near the central body.

8. An actuator module, comprising:
a motor;
a gear module connected to the motor;
an output unit acting on an external load;
a variable-stiffness elastic body configured for transmitting power from the gear module to the output unit, the variable-stiffness elastic body comprising:
a link portion configured to receive torque from the gear module or the output unit, and
a spring portion connected to the gear module or the output unit that is not connected to the link portion in order to receive torque therefrom, the variable-stiffness elastic body having stiffness that varies due to contact between the link portion and the spring portion when deformed by torque; and
a sensor configured to sense deformation of the spring portion,
wherein the spring portion comprises:
a central body connected to the gear module or the output unit to receive torque therefrom;
a connection portion extending outwards from the central body; and
a deformable portion extending from an outer end of the connection portion along a circumference of the central body, the deformable portion being bent multiple times so as to repeatedly approach and move away from the central body, the link portion being integrally connected to the deformable portion,
wherein the connection portion includes a plurality of bars each having a substantially straight elongated body, and
wherein the link portion radially extends from a circumference of the deformable portion toward the central body.

9. The actuator module according to claim 8,
wherein the deformable portion comprises:
a first elastic portion comprising a first circumferential portion disposed opposite to the central body, with the link portion interposed therebetween, and a first radial portion extending from both ends of the first circumferential portion toward the central body; and
a second elastic portion comprising a second circumferential portion extending bidirectionally from the outer end of the connection portion to be opposite to the central body, and a second radial portion extending from both ends of the second circumferential portion toward the central body, the second radial portion being bent near the central body to be connected to the first radial portion, and wherein the link portion radially extends from the first circumferential portion, and wherein the first elastic portion and the second elastic portion are alternately arranged along the circumference of the central body.

\* \* \* \* \*